(12) United States Patent
Jonnala et al.

(10) Patent No.: US 8,181,240 B2
(45) Date of Patent: May 15, 2012

(54) METHOD AND APPARATUS FOR PREVENTING DOS ATTACKS ON TRUNK INTERFACES

(75) Inventors: Premkumar Jonnala, Hayward, CA (US); Neha M. Shah, Santa Clara, CA (US); Sivakumar Narayanan, Santa Clara, CA (US); Adam J. Sweeney, San Jose, CA (US); Silviu Dobrota, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1224 days.

(21) Appl. No.: 11/152,625

(22) Filed: Jun. 14, 2005

(65) Prior Publication Data
US 2006/0282892 A1 Dec. 14, 2006

(51) Int. Cl.
*G06F 17/00* (2006.01)
(52) U.S. Cl. ............. 726/15; 726/13; 713/153; 370/256
(58) Field of Classification Search .................. 709/242; 370/256; 726/13, 15; 713/153; 702/242
See application file for complete search history.

(56) References Cited

U.S. PATENT DOCUMENTS

| 6,578,086 | B1 * | 6/2003 | Regan et al. | 709/242 |
| 7,383,574 | B2 * | 6/2008 | Burrows et al. | 726/13 |
| 2006/0272018 | A1 * | 11/2006 | Fouant | 726/23 |
| 2009/0003213 | A1 * | 1/2009 | Tzeng | 370/235 |

OTHER PUBLICATIONS

Cisco Systems Inc. (Document ID 10601): Securing Networks with Private VLANs and VLAN access Control Lists, Found on the internet: >http://www.cisco.com/warp/public/473/90.shtml<,Pub. Mar. 15, 2005, pp. 1-22.*

"Understanding Spanning-Tree Protocol Topology Changes", Cisco Systems, Inc.; Dec. 31, 2004; (10 pages); Downloaded on May 24, 2005 from http://www.cisco.com/warp/public/473/17.pdf.
"Understanding and Configuring VLAN Trunk Protocol (VTP)"; Cisco Systems, Inc.; Mar. 15, 2005; (29 pages); Downloaded on May 24, 2005 from http://www.cisco.com/warp/public/473/21.pdf.
ExtremeWare 6.2.2 Software User Guide, Chapter 1—ExtremeWare Overview, (pp. 23-30); Downloaded on Mar. 16, 2005 from http://www.extremenetworks.com/SERVICES/documentation/ExtremeWareUser622.zip.
ExtremeWare 6.2.2 Software User Guide, Chapter 5—Virtual LANs (VLANs), (pp. 91-108); Downloaded Mar. 16, 2005 from http://www.extremenetworks.com/SERVICES/documentation/ExtremeWareUser622.zip.
ExtremeWare 6.2.2 Software User Guide, Chapter 13—Spanning Tree Protocol (STP), (pp. 231-242); Downloaded on Mar. 16, 2005 from http://ww.extremenetworks.com/SERVICES/documentation/ExtremeWareUser622.zip.

* cited by examiner

*Primary Examiner* — Eleni Shiferaw
*Assistant Examiner* — Paul Callahan
(74) *Attorney, Agent, or Firm* — Campbell Stephenson LLP

(57) ABSTRACT

A method of protecting a data network from denial of service (DOS) attacks is described. The method may use various network tools to selectively block or disable portions of a data trunk experiencing a DOS attack, thereby preventing the DOS attack from reaching at least some resources on the network. In one embodiment, a network switch identifies a virtual LAN (VLAN) carrying suspect data on a data trunk. The network switch then adjusts a spanning tree for the network so that one or more ports on the compromised VLAN are blocked or disabled, while non-compromised VLANs are allowed to continue carrying data. Other approaches are also presented for avoiding the loss of valid data when a network blocks one or more VLANs or other portions of a network in response to a DOS attack or other intrusion.

31 Claims, 5 Drawing Sheets

METHOD AND APPARATUS FOR PREVENTING DOS ATTACKS ON TRUNK INTERFACES

BACKGROUND OF THE INVENTION

1. Field of the Invention

The invention relates generally to the field of networked data communications, and specifically to the field of network resilience and security.

2. Description of the Related Art

Virtual local area networks (VLANs) may be used to arrange communications among a group of devices so that the devices communicate as if they were connected by a common local area network (LAN). The devices in a VLAN may reside on one or more LANs, with non-local networks connecting the traditional LANs. The VLAN facilitates communications among the various machines, allowing users and network administrators to more readily expand operations beyond the confines of a single traditional LAN. In one sense, a VLAN may be identified as a collection of physical ports on one or more bridges and/or switches, with the ports associated together as sharing a local network structure.

Network administrators can benefit from tools that help prevent unwanted intrusions on their networks from external sources. One type of intrusion is a denial-of-service (DOS) attack. In a DOS attack, an outside party attempts to prevent legitimate users from being able to access or use resources on a network. DOS attacks commonly take the form of a large amount of incoming network traffic that floods network resources, such as central processing units (CPUs), ports, bridges, switches, and routers.

The goal of attackers in this type of attack is generally to prevent legitimate network traffic from reaching the network resources. In various situations, a DOS attack may attempt to maliciously disrupt connections to a machine, thereby disabling services provided by that machine. In other situations, a DOS attack may be an attempt to prevent a particular individual from accessing a service. DOS attacks may also be attempted as a part of a larger coordinated attack.

Most commonly, a DOS attacker may direct a large number of data packets to one or more devices on a target network. The flood of packets may generally be an attempt to consume much or all the available bandwidth or capacity on one or more portions of the target network. This type of attack may have a large variety of forms. For example, the DOS packets may be simple ICMP ECHO packets, but may alternatively be any other type of data that would be received by the target network. Also, the attacker may launch the attack from a single machine or from multiple machines. One trend in DOS attacks has been to mask the origin of attacks through the use of widely distributed "zombie" machines—computers that are maintained by unsuspecting owners, but which have been infected by a virus programmed to launch a coordinated DOS attack at a predetermined future time.

DOS attacks may also be an unintended consequence of improper but non-malicious activity. For example, a legitimate user may have unintentionally but incorrectly configured a remote system in such a way that repeatedly transmits data to a network server in a rapid endless loop. In some circumstances, the resulting flow of data may flood a resource on the network. Regardless of their source or purpose, DOS attacks may hinder or disrupt a network or a network resource if an appropriate response is not made to the attack.

VLANs generally share ports so that multiple VLANs may communicate through a common resource. Such shared resources, or trunks, may be shared physical connections between two switches or between other network devices. Trunks may be carried on physical connections such as twisted-pair cables, optical fibers, or wireless links. In some circumstances, multiple trunks may share a single physical connection. Alternatively, or in addition, trunks may be logical constructions that use more than one physical connection. To protect network resources from DOS attacks, a network may automatically disconnect a trunk to prevent the propagation of the attack on that trunk. Such a measure may disrupt the flow of the DOS attack, and protect network devices that are downstream from the attack. However, this protection also disrupts other traffic on the trunk, causing a loss of valuable data flows.

BRIEF DESCRIPTION OF THE DRAWINGS

A more complete understanding of the present invention may be acquired by referring to the following description and the accompanying drawings, in which like reference numbers indicate like features.

Figure 1:
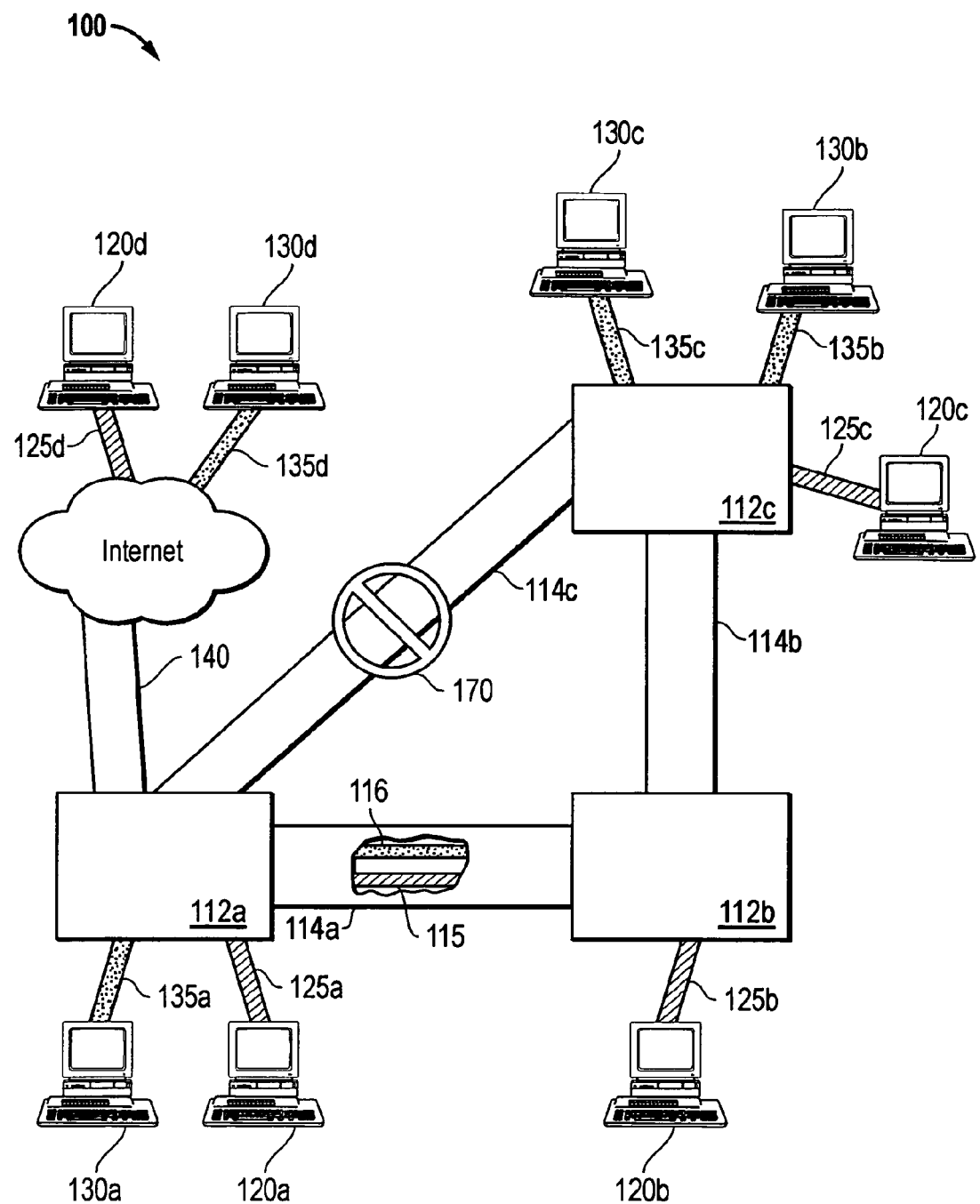
FIG. 1 is a block diagram of a data network with features to protect the data network's resources.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of one implementation of a data network 100 that uses techniques to protect the data network's resources. As depicted, data network 100 includes three switches 112(a, b, and c), eight network devices 120(a, b, c, and d) and 130(a, b, c, and d), eight local connections 125(a, b, c, and d) and 135(a, b, c, and d), and four trunks 114(a, b, and c) and 140.

Switches 112(a-c) and network devices 120(a, b, c, and d) and 130(a, b, c, and d) may each include a processing unit, memory, input/output devices, and storage media to provide network services as well as other services. The switches and network devices may use a variety of software stored on fixed or removable media such as hard drives and other magnetic media, optical disks, and volatile and non-volatile semiconductor memories.

Various connections are made among the elements of data network 100, as illustrated by example in FIG. 1. Trunk 114(a) couples switches 112(a) and 112(b). Similarly, trunk 114(b) couples switches 112(b) and 112(c), and trunk 114(c) couples switches 112(c) and 112(a). While trunks 114(a, b, and c) and 140 are each depicted here as single physical connections, more than one physical connection may be used for each trunk. The trunk may in general be a logical tool for managing the transfer of data among network components. Network devices 120(a) and 130(a) are coupled to switch 112(a) through local connections 125(a) and 135(a), respectively. Network device 120(b) is connected to switch 112(b) through local connection 125(b). Network devices 120(c), 130(b), and 130(c) are coupled to switch 112(c) through local connections 125(c), 135(b), and 135(c), respectively. Depending on the protocols and configurations used for trunks 114(a and b), portions of data network 100 may comprise a LAN or a portion of a LAN. Trunk 140 couples a port on switch 112(a) with an external network, such as a wide area network (WAN) or a metropolitan area network (MAN), which may provide more general communication with the Internet, as depicted. Data network 100 may include network devices 120(d) and 130(d) that are linked to other components of data network 100 through the Internet. Network devices 120(d) and 130(d) are coupled to the Internet through local connections 125(d) and 135(d), respectively.

Data network 100 includes two virtual local area networks (VLANs). In this example, a first VLAN 115 includes network devices 120(a-d), and a second VLAN 116 includes network devices 130(a-d). Each VLAN transmits data through switches 112(a-c). In this depicted example, the two VLANs have been configured to provide isolation between data that travel on the separate VLANs. Such isolation may be enforced by VLAN protocols even in situations where separate VLANs share trunks, ports, and switches on a physical network. This isolation is represented in FIG. 1 by two conceptually separate data connections for the first VLAN 115 and for the second VLAN 116 inside trunk 114(a). This separation illustrates a logical isolation between the two VLANs 115 and 116. Since trunks 114(a, b, and c) and 140 may carry multiple VLANs in this embodiment of the data network 100, these trunks may be considered as VLAN trunks. As described below, various features of network trunks such as VLAN trunks may be used to defend a network against DOS attacks or other intrusions.

VLANs may be used for a variety of purposes. A VLAN may be used to arrange communications among a group of devices so that the devices communicate as if they were coupled by a common LAN. For example, network device 130(d) may communicate with network device 130(a) in FIG. 1 using a version of localized routing, despite the use of the Internet as a portion of the data path between these two devices. The communication is facilitated by the VLAN 116 that includes both devices 130(a and d).

Other advantages may also be available through VLANs. For example, VLANs may improve the efficiency of networks by preventing unnecessary cross-VLAN traffic. With traditional networks, congestion may occur when broadcast data is directed to all network devices on a LAN, without regard to whether all the devices require the data. VLANs may increase the efficiency of a network because each VLAN may be configured to include only those devices that must communicate with each other. A data network may segregate the flow of traffic on network devices by using one or more VLANs to limit the reach of various data flows. For example, VLAN traffic from network device 130(a) may be limited so that it is directly transmitted only to other devices on the same VLAN. Thus, switches 112(a-c) would direct traffic from network device 130(a) only to network devices 130(b-d). Devices in different VLANs may still communicate with each other through a switch or routing device between the different VLANs. Thus, switch 112(a) may provide communications, when needed, between network devices 130(a) and 120(a).

VLANs may also be used to provide data security. Depending on the VLAN configuration, if a device in one VLAN on a company's network must communicate with a device in another VLAN on the company's network, the traffic must cross a routing device. The routing device may then be used as a central screening point to monitor for unauthorized or improper network access. Such security features and other traffic-management features may make VLANs useful even for networks that are confined to a single traditional LAN.

A variety of characteristics may be used to define a VLAN. For example, a VLAN may be constructed by specifying the slot and/or port numbers of physical ports on bridges, switches, and other devices to be included in the VLAN. Resources on the network may then direct traffic only among the specified ports of each VLAN. A list of MAC addresses may alternatively be used for identifying the ports that are members of a VLAN.

With additional structuring, individual ports on a switch may be used for more than one VLAN. For example, data transmitted through a switch may be segregated into separate VLANs according to the type of protocol used for the data, such as Ethernet or AppleTalk, for example. In such a situation, a switch may be configured to direct Ethernet traffic to a first set of destination ports on the network, while directing AppleTalk traffic to a different set of destination ports on the network. Alternatively, or in addition, the data on a VLAN may be identified by data tags, such as 802.1Q tags, attached to information transmitted among a VLAN's devices. Various tags may then identify packets of data as being destined for the ports on particular VLANs. For example, a switch may be configured to direct packets with VLAN tag "21" to a first set of destination ports on the network, while directing packets with VLAN tag "28" to a different set of destination ports on the network.

Tags may be used to define VLANs that traverse more than one LAN. Such VLANs may include devices on two or more separate local networks, with one or more switches on each of the local networks. The separate networks may communicate through connections between the switches on different local networks. The switch-to-switch connections within networks and between networks may be referred to as trunks, such as trunks 114(a-c) and 140 in FIG. 1. Tags may be a useful tool in such VLANs: the switches may route traffic based on the tags. Data with different VLAN tags may be routed by the switches from the trunks to the appropriate devices on the various local networks. In data network 100 from FIG. 1, tags may be used to identify VLAN data received from the Internet through switch 112(a) to network devices 120(a-c) and 130(a-c).

Various techniques may be used to enhance the logical separation of data between different VLANs on a network. Such techniques may be used to efficiently use a single VLAN trunk to provide connections for multiple VLANs between two devices. For example, switches that handle VLAN traffic may use low-level addressing, such as Layer 2 switching, to ensure that the VLAN traffic is segregated at a basic level of network operation. Similarly, a network switch may enhance the segregation of VLANs by using port-specific hardware to direct the forwarding of data arriving at the switch. The use of port-specific hardware may provide a system with more efficient or more rapid forwarding of network traffic than would the use of software running on a central processor.

VLAN trunks may use a spanning tree protocol (STP) to streamline the connectivity among various devices in a network. In general, an STP may be used by switches, routers, bridges, and other network devices to enhance the fault tolerance of a network. An STP may be implemented according to the IEEE 802.1D standard, or may be a formally or informally customized variant. The STP may be used to eliminate undesirable loops in a network, while preserving capabilities for path redundancy. In general, a network such as an Ethernet network requires that only one path be active between any pair of network devices. Loops occur in networks where a network topology allows multiple pathways between various devices. Network designers may create such physical loops in a deliberate attempt to allow topological redundancy, so that in case one link or switch fails, another may be available for connecting portions of a network. Without adjustments, however, such loops may impede the function of a network.

An STP may allow bridges and/or switches to communicate with each other to identify physical loops in a network. The bridges and/or switches may then use STP rules to block network traffic from using certain links, so that the network has a loop-free logical topology. For example, an STP may allow the bridges and/or switches of a network to define a tree structure of loop-free leaves and branches that spans the entire network. The STP may then monitor network connectivity and adapt the availability of links to ensure that (a) any redundant paths are blocked while a main path is operational, and (b) a redundant path is un-blocked if a main path fails.

One example of the uses of an STP is shown in FIG. 1. As illustrated, a loop is present in the connectivity among switches 112(a, b, and c). For example, data may be transmitted from switch 112(a) to switch 112(c) by two paths: either directly through trunk 114(c), or through trunks 14(a and b) via switch 112(b). The availability of such multiple paths may be referred to as a spanning-tree loop. This loop creates an ambiguity in the data pathway between switch 112(a) to switch 112(c), since either path is capable of communicating the data between the two switches. To prevent the ambiguity of such a loop, the STP may instruct switches 112(a) and (c) to block one of the paths. This block is represented in the drawing by an STP block 170 (circle/slash symbol) over trunk 114(c). With the redundant trunk 114(c) blocked, switches 112(a) and (c) may communicate only through the path involving trunks 114(a and b) and switch 112(b). If a component in this remaining path were to fail, the STP may re-enable the redundant trunk 114(c) to restore communication between switches 112(a) and (c).

The blocking of trunk 114(c) may be accomplished using general features of an STP that are useable with regular LANs. An STP may also have additional features that are particularly used with VLANs. Such features may be used to provide protection against DOS attacks and other network intrusions.

Data network 100 may use the blocking ability of the STP to provide further functionality, in addition to the function of resolving spanning-tree loops. In one implementation of data network 100, the STP may be used to protect a switch from a DOS attack. The blocking may be selective, so that the switch is protected from the DOS attack without disrupting all other network traffic into the switch. Selective blocking may be implemented with the STP so that a switch blocks an individual VLAN, such as VLAN 115 or VLAN 116, without blocking an entire trunk, such as trunk 114(a).

Figure 2:
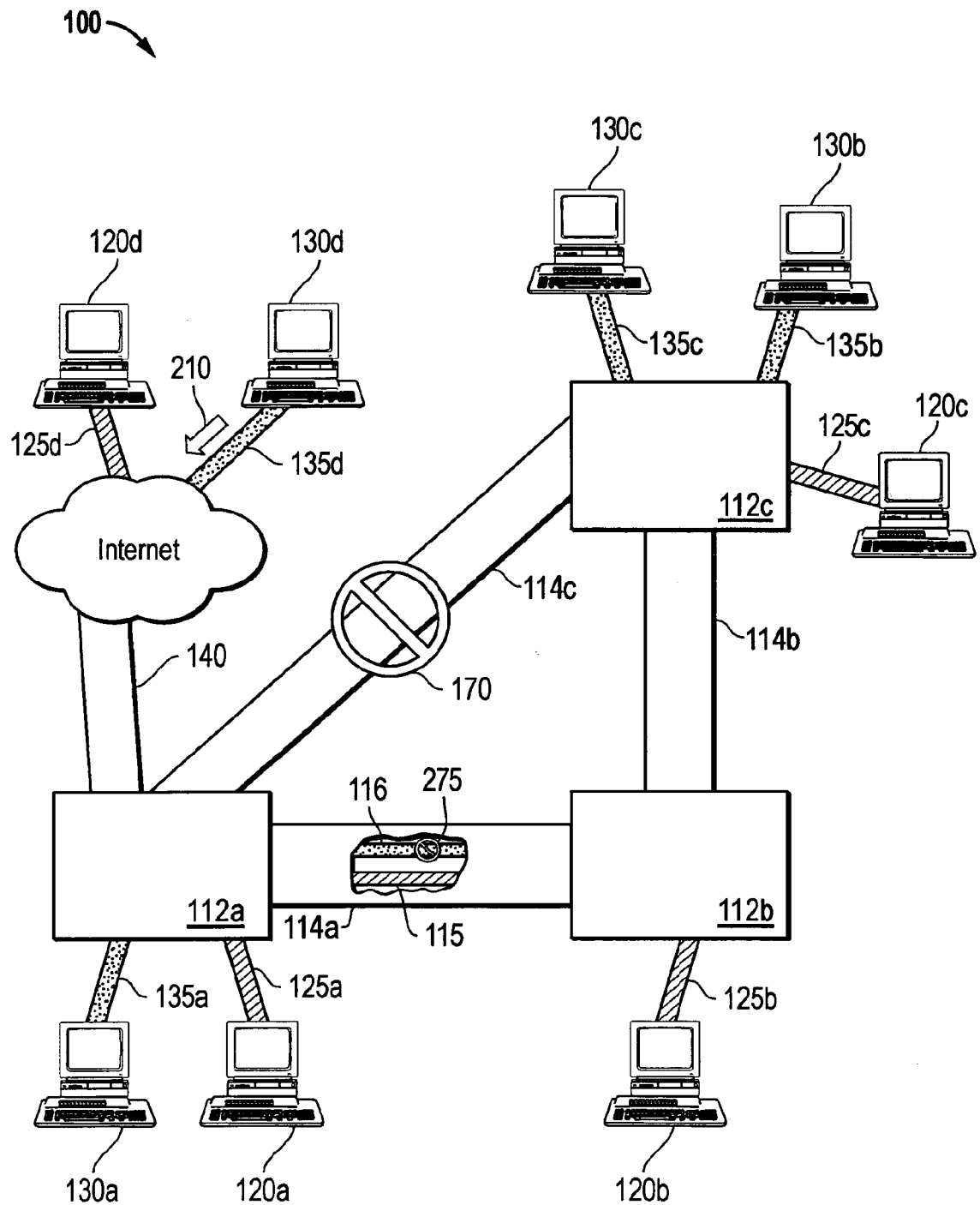
FIG. 2 is a block diagram of a data network responding to a DOS attack.

FIG. 2 is a block diagram of the data network 100 responding to a DOS attack. In the illustrated scenario, a DOS attack 210 has been launched on data network 100 through network device 130(d). Network device 130(d) may be the origin of the DOS attack, or may be an unwitting participant in an attack launched from another network device (not shown). The DOS attack 210 is transmitted from network device 130(d) through local connection 135(d), and reaches data network 100 through the Internet and through trunk 140. The DOS attack then propagates through data network 100. The attack may have a specific target, such as network device 130(b) or switch 112(c). Since the DOS attack comes through a network device (130(d)) that is coupled to VLAN 116, the DOS attack propagates along that VLAN, which traverses trunk 140 to switch 112(a), then trunk 114(a) to switch 112(b), and trunk 114(b) to switch 112(c). In addition, network devices 130(a-c) may be suspect to the attack, since these devices are also coupled to VLAN 116.

As illustrated in this example, the DOS attack has been detected by switch 112(b). To respond to the DOS attack, switch 112(b) has blocked its VLAN port for VLAN 116 on trunk 114(a). This blocking is represented in FIG. 2 by an STP block 275 (circle/slash symbol) over VLAN 116 in trunk 114(c). Techniques for imposing an STP block are discussed in further detail below. The STP block 275 created by switch 112(b) renders communication on VLAN 116 unavailable between switch 112(a) and switch 112(b). STP block 275 thus protects switch 112(b) from the DOS attack coming through switch 112(a) on VLAN 116. Note that STP block 275 also protects switch 112(c) and network devices 120(b) and 130(b and c), since these devices are downstream from switch 112(b) on VLAN 116.

The protective STP block 275 may be imposed in such a way that other network protocols are not triggered into seeking a repair of the protective block. For example, the network's STP may be configured so that automated procedures do not open the regular spanning tree block 170 in an attempt to resume the flow of traffic. In this situation, the removal of STP block 170 would create a new route for the DOS attack, and would work against the protection created by STP block 275. Thus, data network 100 may create the protective STP block 275 in such a manner that this block does not prompt an updating of the network's existing spanning tree.

While FIG. 2 illustrates a protective STP block being imposed by switch 112(b), other switches may impose a protective block instead of, or in addition to, the block by switch 112(b). In some implementations of data network 100 it may be helpful for the block to be created as far upstream as possible. For example, switch 112(a) may block VLAN 116 on trunk 140, thereby protecting all the network devices that are downstream from that point. In other implementations, the block may be imposed as far downstream as possible. For example, switch 112(c) may block VLAN 116 on trunk 114(b), thereby allowing valuable data on VLAN 116 to reach all the network devices that are upstream from that point. Data network 100 may also employ some flexibility in selecting one or more blocks to protect the network devices from a DOS attack.

In some implementations of the data network 100, the protective STP block 275 may be used in conjunction with other defensive procedures. For example, the STP block may be an automated response that defends the network while other automated or manual responses begin to engage the DOS attack. Similarly, the STP block may be used as a temporary solution while other measures are taken to cause the DOS attack to cease.

Various implementations of the data network may allow a spanning tree to be updated after a protective block has been imposed on a VLAN. It is contemplated that in such implementations, a spanning tree may be re-formulated after a protective block has been imposed on a VLAN. A revised spanning tree may be helpful, for example, to establish a spanning tree root that is suitable for the topology of the network, in view of the protective block. The new spanning tree may result in a better flow of legitimate traffic on the data network, while still providing some protection from a DOS attack. Further, the procedure may be iterative, with spanning trees and protective blocks being re-formulated in a procedure that converges on a network configuration that is optimized in response to a DOS attack.

While protecting elements of data network 100, STP block 275 has the cost of preventing communication with these elements through VLAN 116. STP block 275 forces the downstream switches and network elements to be out of communication with upstream portions of the data network. This consequence may be considered a cost of imposing the protective block. However, this cost may be insignificant or zero in comparison with the alternative of not imposing the block. System designers may use various considerations when implementing the response rules for imposing a block such as STP block 275. In general, such response rules may weigh the cost of imposing a protective block (and thwarting a DOS attack) against allowing data to flow (and suffering the effects of a DOS attack).

As a starting consideration, for example, a designer may decide that STP block 275 does not cause additional harm when it is imposed in response to a DOS attack that would otherwise completely cripple switch 112(*b*). In such a situation, STP block 275 would not disrupt network 100 any more than would allowing the DOS attack to proceed: the cost of thwarting the attack is equal to or less than the cost of allowing the attack. When deciding how to respond to DOS attacks, then, designers may weigh a variety of considerations, such as the peak load of the DOS attack, the average load of the DOS attack, other measures of the severity of the DOS attack, the availability of other responses to the DOS attack, the capacity and resilience of switches and network elements subject to the DOS attack, and other factors.

If a DOS attack is of a severity that may partially—but not completely—hinder network performance, then the cost of thwarting an attack may not be less than the cost of allowing the attack to proceed. This may be the case where a large amount of highly valuable data traffic would be lost when a block is used to thwart a DOS attack that is relatively weak or inconsequential. In response to such attacks, system designers may consider additional factors, such as the value of non-attacking network traffic that would be lost if a protective block were imposed on the system. Such considerations may involve complex assessments of the relative value of different components of network traffic.

Data network 100 may simplify the considerations used in deciding when to impose a protective block. As illustrated in FIG. 2, STP block 275 prevents the flow of network traffic on VLAN 116 in portions of data network 100. If STP block 275 is appropriately implemented, then traffic on other VLANs, such as VLAN 115, is not affected by the block. Thus, STP block 275 may allow data network 100 to selectively punish a VLAN that carries a DOS attack, without affecting other VLANs in the network.

The ability to selectively block only VLANs that carry DOS attacks may be helpful to system operators. The selectivity of STP block 275 may be seen, for example, in contrast with alternative protective measures, such as a block that prevents all data flow on a trunk. For example, consider again the situation in FIG. 2, where a DOS attack has been detected on VLAN 116. Here, VLAN 116 may also be carrying non-attacking data. Other VLANs, such as VLAN 115, may carry only non-attacking data. A block that shuts down all data on trunk 114(*a*) would thwart the attack, but may have a substantially high cost. Not only would such a block disrupt valuable non-attacking traffic on VLAN 116, but it would also disrupt valuable non-attacking traffic on VLAN 115, and on any other VLANs running through trunk 114(*a*). In contrast, STP block 275 disrupts valuable non-attacking traffic on VLAN 116, but allows VLAN 115 and other VLANs to continue operating.

Further, the selectivity of STP block 275 may assist system designers. Since STP block 275 may only affect a limited number of data flows (only those on VLAN 116), designers may create protective rules that more readily impose protective blocks. The selectivity of STP block 275 reduces the collateral damage of a protective block. By reducing the cost of thwarting a DOS attack, STP block 275 may allow designers to lower the threshold conditions for imposing a protective block, thereby enhancing the ability of data network 100 to respond to DOS attacks.

Figure 3:
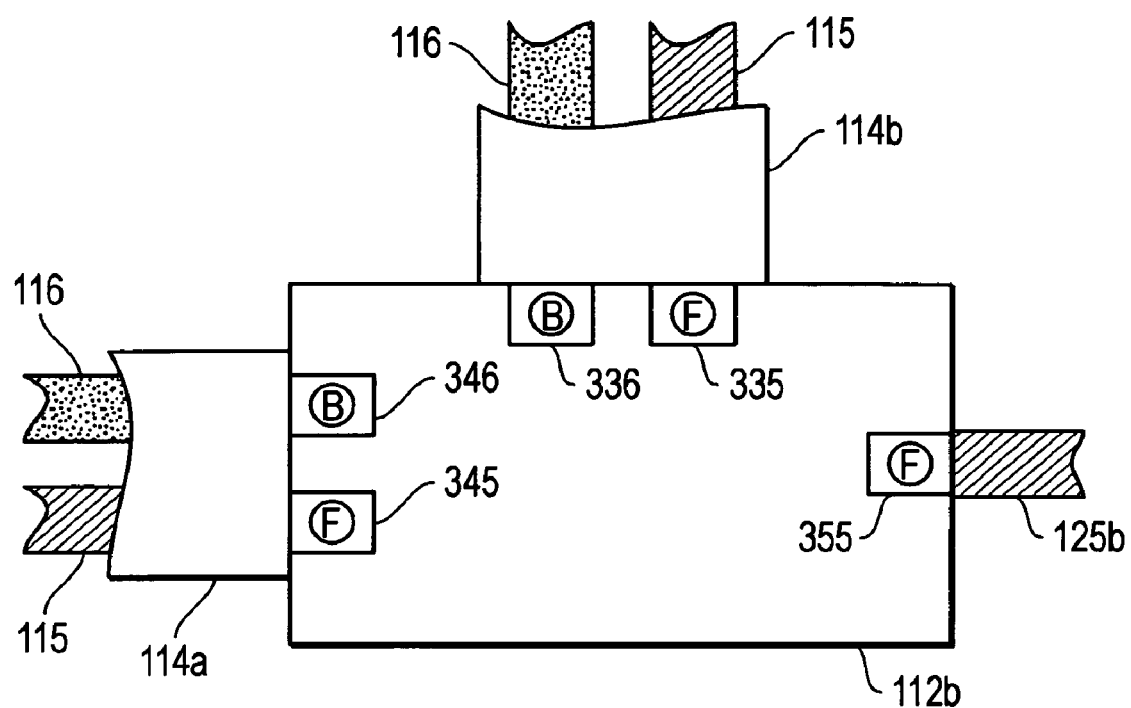
FIG. 3 is a block diagram of one implementation of a switch in the data network from FIG. 2.

FIG. 3 is a block diagram of one implementation of a switch in the data network from FIG. 2. Here, switch 112(*b*) selectively blocks VLAN ports in response to a DOS attack. Switch 112(*b*) includes ports 335, 336, 345, 346, and 355. Trunks 114(*a* and *b*) and local connection 125(*b*) are coupled to switch 112(*b*) through the ports 335, 336, 345, 346, and 355. Trunks 114(*a* and *b*) carry traffic that includes traffic segregated into VLANs 115 and 116. Local connection 125(*b*) carries traffic only for VLAN 115.

Ports 335, 336, 345, 346, and 355 may each be separate physical ports, such as high data-rate Ethernet ports. For example, one or more of the ports may conform to one of the following standards: 10/100/1000BASE-T, 1000BASE-X, 1000BASE-LX, GBIC-based 1000BASE-SX, 10GBASE-CX4 (802.3ak), 10GBASE-T, or 10GBASE Fiber (802.3ae), among others. The ports may include common Ethernet ports with RG-45 interfaces, or wireless Ethernet ports such as 802.11(b), 802.11(g), or 802.11(a) ports. Other types of ports may also be used, and may conform to a standardized Layer 2 networking protocol.

It is noted that the ports may include a variety of logical ports. Ports 335, 336, 345, 346, and 355 may include one or more separate physical ports that have been configured to operate as multiple logical ports. For example, as illustrated in FIG. 3, ports 335 and 336 are logical ports that share a common physical interface to trunk 114(*b*). Similarly, ports 345 and 346 share an interface that couples with trunk 114(*a*). In this illustrative example, these four ports each couple switch 112(*b*) with one of the VLANs on either trunk 114(*a*) or 114(*b*). Ports 345 and 346 couple switch 112(*b*) with VLAN 115 and 116, respectively, on trunk 114(*a*). Ports 335 and 336 couple switch 112(*b*) with VLAN 115 and 116, respectively, on trunk 114(*b*). Port 355 is a single physical port on switch 112(*b*), and provides coupling with local connection 125(*b*).

Switch 112(*b*) may implement the STP block 275 using a variety of approaches. For example, a switch may use STP states for the various ports to impose a block on a VLAN. STP states may be used by a spanning tree protocol to control the connectivity of a network. Depending on implementation, a forwarding STP state may allow a port on a switch to accept and forward or route network traffic that arrives at the port. Similarly, a blocking STP state may allow a switch to ignore network traffic that arrives at a port. In FIG. 3, switch 112(*b*) has placed port 346 into a blocking ("B") state, and has placed port 345 is in a normal forwarding ("F") state. With these STP states, switch 112(*b*) blocks the flow of traffic arriving on VLAN 116 through trunk 114(*a*)—including any DOS data on VLAN 116, while accepting traffic arriving on VLAN 115 through trunk 114(*a*). The STP states of ports 345 and 346 may thus be used to implement the STP block 275 shown in FIG. 2.

In FIG. 3, ports 335, 345, and 355 have been placed in the forwarding STP state, since these ports carry traffic for VLAN 115, and have not been subjected to a DOS attack in the illustrated scenario. Port 336 has been placed in a blocking STP state, since this port carries traffic for the DOS-compromised VLAN 116. However, other implementations of the switch 116 may not block port 336, since this port is not a source of DOS traffic. Once port 346 has been blocked, software in switch 112(b) may decide that the switch has been adequately protected from the DOS attack on VLAN 116. Switch 112(b) may then leave port 336 in a forwarding state, and downstream portions of VLAN 116 may be allowed to continue operation as much as possible.

STP states may be implemented by a switch in a manner that avoids placing unnecessary loads on a central processor for the switch. For example, instead of being implemented by software, STP states may be effected by hardware that is localized to individual ports. Alternatively, or in addition, ports may use Layer 2 protocols to block incoming data when required by an STP state. For example, port 346 in switch 112(b) may use a Layer 2 protocol to block incoming data with localized hardware, and may thus avoid sending DOS traffic to a central processing unit (CPU) on the switch. Such an architecture may protect the switch CPU from the disruptive effects of the DOS attack.

Depending on their configuration, switches 112(a) or 112(c) may also respond to the DOS attack 210 by similarly using STP blocking states on ports coupled to VLAN 116. STP blocking states may also be used on appropriate ports in switches 112(a) or 112(c) or both to implement the topological STP block 170.

While FIG. 3 describes a response to a DOS attack using VLAN ports. It is contemplated that other types of logical ports, in addition to or instead of VLAN ports, may be used for blocking DOS attacks and other network intrusions.

Figure 4:
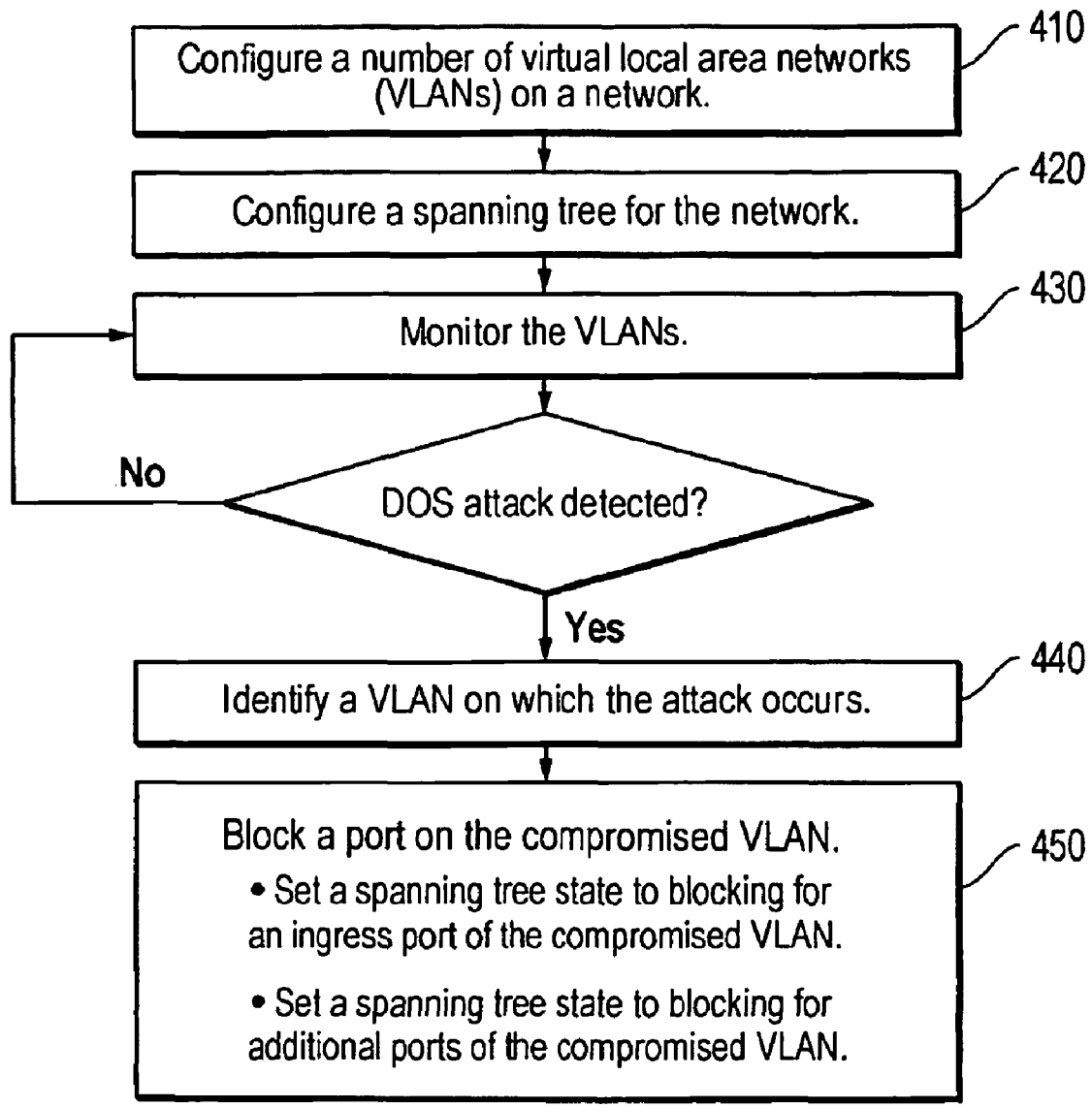
FIG. 4 is a flow diagram for one implementation of a procedure for responding to a DOS attack on a computer data network.

FIG. 4 is a flow diagram for one implementation of a procedure for responding to a DOS attack on a computer data network. The procedure may begin with some preliminary configuration of the network. In act 410, the network is configured with one or more VLANs. For example, an administrator may configure the network so that its resources are available to a number of separate customers. A customer may be assigned to a separate VLAN on the network, so that the customer's data traffic may be isolated or protected from other network traffic. In some implementations of the method, a separate VLAN is assigned to each customer of the data network.

As another preliminary measure in act 420, the network may initialize and maintain a spanning tree. The spanning tree may provide a topological mapping of the network, and may block certain pathways on the network to prevent spanning-tree loops.

In act 430, the network may be monitored for suspect data, such as data that may be part of a DOS attack. Other types of attacks may also be monitored by this procedure. For example, instead of or in addition to searching for DOS attacks, the procedure may also monitor for other suspect data, such as unauthorized usage of the network, viruses, worms, Trojan horses, or other harmful network traffic. Responses to such suspect data may include efforts to minimize the impact on the network, such as described below with regard to DOS attacks.

The monitoring in act 430 may be performed by one or more switches on the network, or by routers, or hubs, or bridges, or by other components of the network. The monitoring may use one or more techniques for detecting suspect data. For example, the monitoring may include an ongoing review of network traffic levels; a statistical comparison of traffic levels with historical data on peak data rates, average data rates, durations of peak flows, and other statistics; or one or more threshold levels for flagging possible DOS attacks; or other tools; or combinations thereof. One measure of network traffic levels may be the rate at which a switch receives packets (or bytes or other units of information). Instead of, or in addition to, examining network traffic levels, the monitoring may check a switch's CPU consumption.

In general, the monitoring may be done by a switch's CPU, or it may be performed by hardware local to a port on a switch. Other hardware components may also be programmed or modified to monitor traffic or CPU consumption. It is also envisioned that a modular hardware unit may be installed in a switch to detect a DOS attack or other intrusions.

Not all DOS attacks involve a flood of incoming data. For example, a DOS attack may be mounted by issuing instructions that incapacitate or confuse a system's resources, so that the resources are not available to legitimate users. Thus, another approach to detecting a DOS attack may involve looking for instructions or patterns in the data itself. In addition to monitoring the rate of packets or CPU consumption, the act of monitoring a network for a DOS attack or other intrusions may include searching for a specific sequence of packets or searching for a specific set of events. The packets or events being sought may not be received at a particularly high rate, but they may nonetheless cause the switch resources to be occupied or busy and unavailable to serve legitimate packets from legitimate clients.

If a DOS attack is detected, then the attack may be observed in act 440 to determine if the attack is localized to one or more VLANs. Depending on the nature of the DOS attack, it may be expected that the DOS attack is localized on one VLAN. Steps may then be taken to limit the response to the single compromised VLAN. If the DOS attack occurs on more than one VLAN, then steps may be taken to limit the response to those compromised VLANs. In such a situation, the response on the various VLANs may vary, depending on the relative severity of the attack on the various VLANs.

Once a compromised VLAN has been identified, that VLAN may be blocked in act 450. If the blocked VLAN has been assigned to a single customer, then only that customer will suffer the cost of the protective blocking. For this reason, a service provider may use separate VLANs for each customer's network services. A service provider may also use port hardware that is capable of differentiating traffic on the various VLANs and capable of applying different spanning tree states to the different VLANs. The blocking may be removed, and the procedure may resume the monitoring 430, once the DOS attack has terminated or has been contained by other measures.

To block a compromised VLAN, a switch may change a spanning tree state to a blocked value for that VLAN. The spanning tree state may be changed on a port that serves as an ingress port for the DOS attack. The ingress point may be the entry point of the DOS attack on a particular switch. Alternatively, various network elements on the network may coordinate to recognize the ingress port as the port that is furthest upstream relative to the flow of DOS traffic. In addition to blocking the ingress port, the procedure may also assign a blocked value to a spanning tree state of some or all of the remaining ports on the compromised VLAN.

As described above, a blocked spanning-tree state on an appropriate port may be used to protect a network against a DOS attack. In certain circumstances, however, modified techniques may be required because a blocked spanning-tree state may be ineffective against certain types of DOS attacks.

For example, a DOS attack may conceivably include a flood of Bridge Protocol Data Units (BPDUs), among others. Such data may be conveyed by a data port even when the spanning-tree state of the port is set to a value of blocked. BPDU messages may generally be used by a network to exchange information among bridges or switches to determine the status of a network. Such messages may be used for testing, and for passing instructions among bridges and switches in the network to deduce the topology of the network. The BPDUs may also be used to instruct one or more switches to allow or block various links on the network, as needed to maintain a loop-free topology. In some implementations of a network, packets of BPDUs may be coordinated by a root switch among the switches and bridges in a network. BPDUs may be used to elect a root switch, so that subsequent communications may be coordinated by the root switch. To ensure such functions, BDPU may traverse a VLAN without being processed by STP, even if STP is enabled on ports of the VLAN and has set some ports to be blocked. This immunity of BPDUs to the STP state of a port may be may be referred to as BPDU tunneling.

In some implementations, therefore, the data network 100 of FIG. 2 may allow BPDU tunneling on the blocked redundant trunk 114(c) and on VLAN 116 in trunk 114(a). In such situations, DOS attacks involving BPDU messages may be forwarded along these data routes, despite the presence of STP blocks 170 and 275. Because STP blocking states would not hinder a BPDU-based DOS attack, other responses may be used in such a situation.

DOS attacks that use BPDUs—or other data that may bypass or be immune to STP blocks—may be handled specially. Against such attacks, it may not be helpful to set a port's STP state to "BLOCKED." Instead, the STP state of a data port may be set to a value of "DISABLED"—so that the VLAN is no longer active in hardware on that port. Depending on the hardware's implementation, this disabled state may prevent the transmission of all data on the port. This situation may impose a heavy burden by hindering the underlying functionality of the data network. The STP-disabled state may prevent transmission of legitimate BPDU control packets, as well as other legitimate data for Layer 2 or other control protocols. This burden may be a factor in deciding whether to defend the network against the DOS attack, as discussed above. In general, a designer may allow such a defense so that the control-plane attack of the BPDU-based DOS may be thwarted. In various embodiments of the method, other hardware features may be used instead of (or in addition to) STP states of the various ports. For example, it is contemplated that a port may be prevented from forwarding a control-packet-based DOS attack by using a VLAN-disable feature of the port. Other tools may also be used to force a port to drop all packets (including control packets) at a port.

Figure 5:
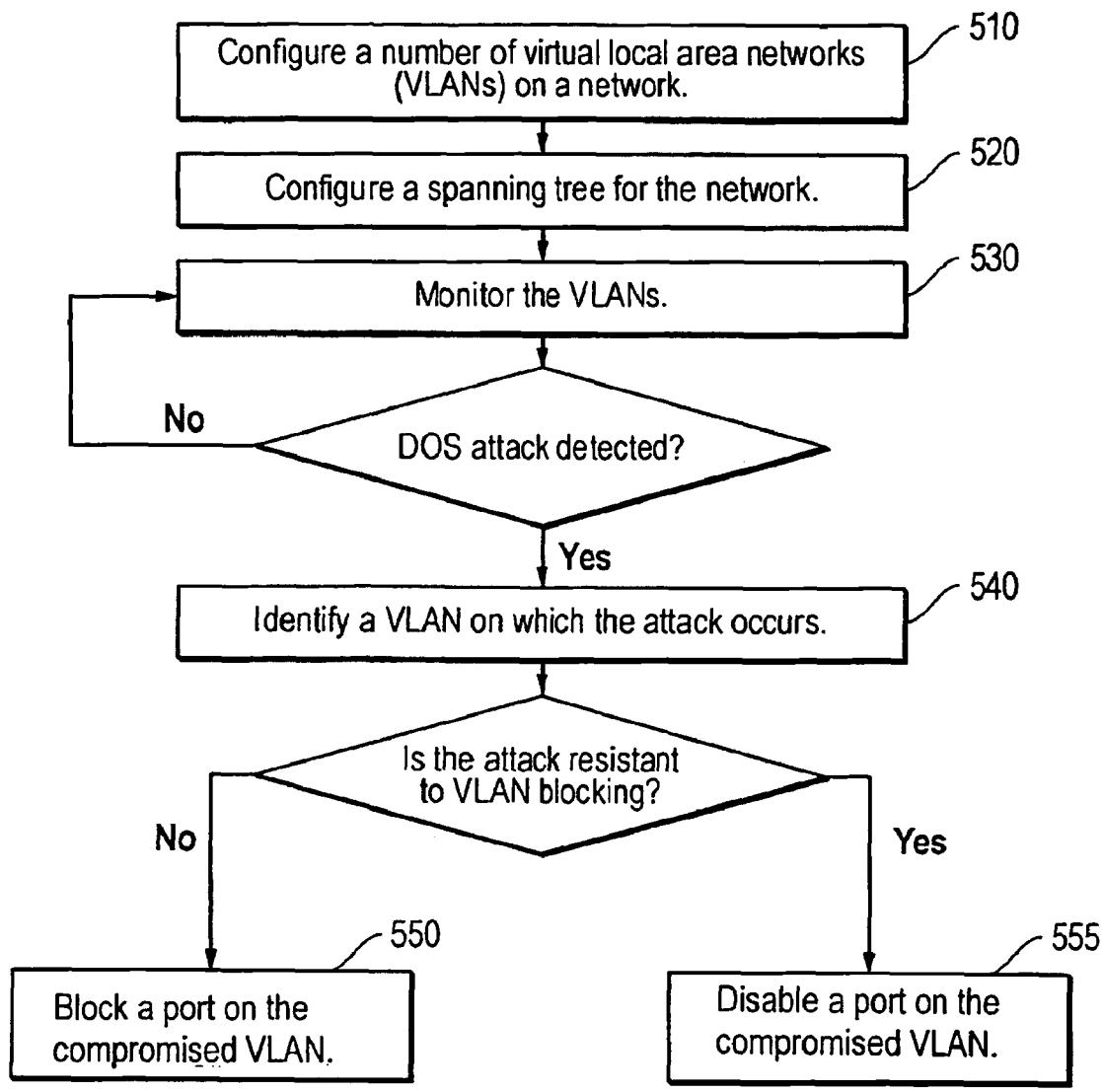
FIG. 5 is a flow diagram for a second implementation of a procedure for responding to a DOS attack on a computer data network.

FIG. 5 is a flow diagram for one implementation of a procedure for responding to a DOS attack on a computer data network, with consideration for the possibility of BPDU-based attacks or other attacks that may be resistant to STP blocking. This implementation of the procedure may use various tools and techniques discussed above with regard to FIG. 4. In act 510, the network is configured with one or more VLANs, and in act 520, the network may initialize and maintain a spanning tree. In act 530, the network may be monitored for a DOS attack or other suspect data. If a DOS attack is detected, then the attack may be observed in act 540 to determine if the attack is localized to one or more VLANs. One a compromised VLAN has been identified, that VLAN may be blocked in act 550, if the type of attack is not a BPDU-based attack (or other blocking-resistant attack). If the compromised VLAN is a BPDU-based or other blocking-resistant attack, then that VLAN may be disabled in act 555. The disabling may include setting an STP state of an ingress port on the VLAN to be disabled. The disabling may also include setting STP states of other ports on the VLAN to be disabled.

Depending on the implementation of a data network, it is contemplated that other per-VLAN protective techniques may be used in addition to, or instead of, a blocked or disabled spanning-tree state. For example, in addition to or instead of using STP blocking and STP disabling, a data network may impose protective blocks using a per-port and VLAN access control list (PVACL) or various network policing tools. Also, other types of logical ports, in addition to VLAN ports, may be used for blocking DOS attacks and other network intrusions. In general, the per-VLAN blocking may be performed by using STP states or by other techniques that enable the ability to distinguish among data packets that are designated for different VLANs on a port or on a trunk. The blocking may be performed by hardware (or combinations or hardware and software) that is separate from the CPU in a switch, so that the CPU may be more readily protected from an attack. Alternatively, or in addition, the blocking may include processing performed by a switch CPU, depending on the environment and the implementation of the protective blocking.

Instead of, or in addition to, blocking or disabling a network pathway that has been compromised by a DOS attack, it is also contemplated that a protective measure may redirect or quarantine the compromised data to a repository for further analysis or archiving. Such redirection may require additional hardware and software resources on a network. An advantage may be that valuable data that happen to be on the same pathway as the DOS attack would not be permanently destroyed. Rather, the data may be cached and made available for future use after the DOS attack has been removed. Further, an analysis of the archived data may be helpful for thwarting the attack, or determining the source of the attack, or responding to future attacks, or preventing future attacks.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method of protecting a data network, the method comprising:
   determining that a first virtual LAN (VLAN) carries suspect data on a data trunk, wherein the first VLAN traverses a plurality of local area networks (LANs); and
   in response to the determining, selectively blocking a VLAN port coupled to the data trunk, wherein
      the VLAN port is configured to communicate only data associated with the first VLAN, and
      the selectively blocking the VLAN port comprises
         setting a network-tree parameter for the VLAN carrying the suspect data in a manner that avoids triggering a repair of a spanning tree for the VLAN carrying the suspect data.

2. The method of claim 1, wherein the selectively blocking the VLAN port comprises leaving unblocked at least one non-compromised VLAN port coupled to the data trunk.

3. The method of claim 1, wherein the selectively blocking the VLAN port comprises setting a parameter usable for avoiding spanning-tree loops.

4. The method of claim 1, wherein the selectively blocking the VLAN port comprises setting a block/unblock parameter for a spanning tree state to a block value for the VLAN carrying the suspect data.

5. The method of claim 1, wherein the selectively blocking the VLAN port comprises setting a parameter for a spanning tree state to a disable value for the VLAN carrying the suspect data.

6. The method of claim 1, wherein:
the selectively blocking the VLAN port comprises imposing a block at an ingress port of the suspect data, and
the imposing the block is performed using hardware localized to the ingress port.

7. The method of claim 1, wherein:
the selectively blocking the VLAN port comprises disabling transmission of control packets at an ingress port of the suspect data, and
the disabling transmission is performed using hardware localized to the ingress port.

8. The method of claim 1, wherein:
the selectively blocking the VLAN port comprises setting an STP state for the VLAN at an ingress port of the suspect data to a block value, and
the setting is performed using hardware localized to the ingress port.

9. The method of claim 1, wherein
the selectively blocking the VLAN port comprises setting an STP state for the VLAN at an ingress port of the suspect data to a disable value, and
the setting is performed using hardware localized to the ingress port.

10. The method of claim 1, wherein the selectively blocking the VLAN port comprises:
determining whether the suspect data is subject to STP blocking, and
if the suspect data is subject to STP blocking, setting an STP state for the VLAN at an ingress port of the suspect data to a BLOCK value, wherein the setting is performed using hardware localized to the ingress port.

11. The method of claim 10, wherein the selectively blocking the VLAN port comprises:
if the suspect data is not subject to STP blocking, setting an STP state for the VLAN at the ingress port of the suspect data to a DISABLE value.

12. The method of claim 1, wherein the determining comprises:
identifying a denial-of-service attack in the VLAN; and
determining that the denial-of-service attack is limited to the VLAN.

13. The method of claim 1, wherein the selectively blocking the VLAN port comprises adjusting a per-port and VLAN access control list (PVACL).

14. The method of claim 1, wherein the selectively blocking the VLAN port comprises using a network policing tool in response to the suspect data.

15. The method of claim 1, wherein the selectively blocking the VLAN port comprises selectively blocking data associated with data tags that correspond to the VLAN carrying the suspect data.

16. The method of claim 1, wherein the selectively blocking the VLAN port comprises selectively blocking data that has an 802.1Q tag associated with the VLAN carrying the suspect data.

17. A method comprising:
establishing a set of virtual local area networks (VLANs) that share a common trunk, wherein
each of the set of the VLANs traverses a plurality of local area networks (LANs);
monitoring the set of the VLANs for suspect data;
identifying a compromised VLAN among the set of VLANs, based at least in part on a result of the monitoring;
blocking a port of the compromised VLAN, wherein
the port is configured to communicate only data associated with the compromised VLAN,
the blocking the port comprises setting a network-tree parameter for the compromised VLAN to a blocking value, and
the setting the network-tree parameter for the compromised VLAN comprises
setting the network-tree parameter for the compromised VLAN in a manner that avoids triggering a repair of a spanning tree for the compromised VLAN; and
leaving unblocked all ports of at least one non-compromised VLAN among the set of VLANs.

18. The method of claim 17, wherein the blocking the port comprises:
setting a block STP state on a port of the compromised VLAN if the suspect data is subject to STP blocking; and
setting a disable STP state on a port of the compromised VLAN if the suspect data is not subject to STP blocking.

19. The method of claim 17, further comprising:
archiving the suspect data in response to the blocking the port of the compromised VLAN.

20. The method of claim 17, wherein
the monitoring the set of the VLANs for suspect data comprises monitoring the set of the VLANs for a denial-of-service attack, and
the blocking the port comprises setting a hardware state of an ingress port of the VLAN to block the denial-of-service attack.

21. The method of claim 17, wherein the blocking the port comprises selectively blocking data associated with data tags that correspond to the compromised VLAN.

22. The method of claim 17, wherein the blocking the port comprises selectively blocking data that has an 802.1Q tag associated with the compromised VLAN.

23. A network device comprising:
a processor;
a memory coupled to the processor;
a port coupled to the processor, wherein the port is configured to be coupled to a data trunk; and
software residing in the memory and executable on the processor; wherein the software is configured to
support a plurality of virtual local area networks (VLANs) on the data trunk, wherein
each of the plurality of the VLANs traverses a plurality of local area networks (LANs),
identify a first VLAN among the plurality of VLANs as a VLAN carrying suspect data,
place the port into a blocking state only for data associated with the first VLAN, wherein the network device is configured to set a network-tree parameter for the first VLAN in a manner that avoids triggering a repair of a spanning tree for the first VLAN, and
maintain the port in a forwarding state for a second VLAN among the plurality of VLANs, wherein the second VLAN carries only data other than the suspect data.

24. The network device of claim 23, wherein the software is configured to set a network-tree parameter for the first VLAN to a blocking value to place the port into the blocking state.

25. The network device of claim 23, wherein the software is configured to set a network-tree parameter for the first VLAN to a blocking value to place the port into the blocking state, and wherein the network-tree parameter is a parameter usable for avoiding spanning-tree loops in the data network.

26. The network device of claim 23, wherein:

the port is configured to impose the blocking state using hardware local to the port; and the software is configured to selectively block data associated with data tags that correspond to the first VLAN.

27. The network device of claim 23, wherein the port is configured to impose the blocking state using hardware local to the port such that the processor is shielded from the suspect data.

28. The network device of claim 23, wherein the software is configured to assign a spanning tree protocol value of BLOCK for the first VLAN to place the port into the blocking state.

29. The network device of claim 23, wherein the software is configured to assign a spanning tree protocol value of DISABLE for the first VLAN to place the port into the blocking state.

30. The network device of claim 23, wherein the software is configured to assign:

a spanning tree protocol value of BLOCK for the first VLAN to place the port into the blocking state, if the suspect data comprises data that is not forwarded through a spanning-tree block; and a spanning tree protocol value of DISABLE for the first VLAN to place the port into the blocking state, if the suspect data comprises data that is forwarded through a spanning-tree block.

31. The network device of claim 23, wherein the software is configured to recognize a denial-of-service attack as suspect data.

* * * * *